United States Patent
Ding et al.

(10) Patent No.: US 12,462,047 B2
(45) Date of Patent: Nov. 4, 2025

(54) METHOD, SYSTEM AND APPARATUS FOR DATA ENCRYPTION

(71) Applicant: Nanjing Tenafe Electronic Technology Co., Ltd., Nanjing (CN)

(72) Inventors: Xiaojun Ding, Shanghai (CN); Zhikai Chen, Shanghai (CN)

(73) Assignee: Nanjing Tenafe Electronic Technology Co., Ltd. (CN)

( * ) Notice: Subject to any disclaimer, the term of this patent is extended or adjusted under 35 U.S.C. 154(b) by 39 days.

(21) Appl. No.: 18/375,150

(22) Filed: Sep. 29, 2023

(65) Prior Publication Data

US 2024/0054237 A1 Feb. 15, 2024

Related U.S. Application Data

(63) Continuation of application No. 18/087,378, filed on Dec. 22, 2022, now Pat. No. 11,809,578.

(30) Foreign Application Priority Data

Aug. 11, 2022 (CN) .......................... 202210961588.1

(51) Int. Cl.
*G06F 21/60* (2013.01)
*G06F 21/78* (2013.01)

(52) U.S. Cl.
CPC ............ *G06F 21/602* (2013.01); *G06F 21/78* (2013.01)

(58) Field of Classification Search
CPC ..... G06F 21/602; G06F 21/78; H04L 9/0631; H04L 9/0618; H04L 63/0435
See application file for complete search history.

(56) References Cited

U.S. PATENT DOCUMENTS

| | | | |
|---|---|---|---|
| 2004/0148512 A1* | 7/2004 | Park ................ | H04L 9/0637 713/193 |
| 2021/0119780 A1 | 4/2021 | Hassan | |
| 2021/0389875 A1* | 12/2021 | Segev ................ | G06F 3/0619 |

* cited by examiner

*Primary Examiner* — Sangseok Park
(74) *Attorney, Agent, or Firm* — Van Pelt, Yi & James LLP

(57) ABSTRACT

It is detected whether a next-to-last raw data block in a raw data segment has been written into an input buffer. A sequence number difference is calculated between sequence numbers of the next-to-last raw data block and a current raw data block. It is determined whether the sequence number difference exceeds a number of operation rounds associated with encryption. In response to: (1) detecting that the next-to-last raw data block has been written into the input buffer and (2) determining that the sequence number difference does not exceed the number of operation rounds, a read of the next-to-last raw data block is triggered. The next-to-last raw data block is encrypted, out of a sequence number order and using Advanced Encryption Standard (AES) processing and a CipherText Stealing (XTS) working mode, to produce a next-to-last encrypted data block. A last raw data block is encrypted using the next-to-last encrypted data block.

20 Claims, 6 Drawing Sheets

METHOD, SYSTEM AND APPARATUS FOR DATA ENCRYPTION

CROSS REFERENCE TO OTHER APPLICATIONS

This application is a continuation of U.S. patent application Ser. No. 18/087,378 entitled METHOD, SYSTEM AND APPARATUS FOR DATA ENCRYPTION filed Dec. 22, 2022, which is based upon and claims priority to People's Republic of China Patent Application No. 202210961588.1 entitled METHOD, SYSTEM AND APPARATUS FOR DATA ENCRYPTION filed Aug. 11, 2022, each of which is incorporated herein by reference for all purposes.

BACKGROUND OF THE INVENTION

Advanced Encryption Standard (AES) processes are widely used in data encryption. The AES processes have a plurality of working modes, such as an XEX tweakable block cipher with CipherText Stealing (XTS) working mode. The data encryption using AES processing and the XTS working mode may be referred to as XTS-AES data encryption for short. New XTS-AES data encryption techniques which improve system performance (e.g., data throughput and/or computational efficiency) would be desirable.

BRIEF DESCRIPTION OF THE DRAWINGS

Various embodiments of the invention are disclosed in the following detailed description and the accompanying drawings.

DETAILED DESCRIPTION

Figure 1:
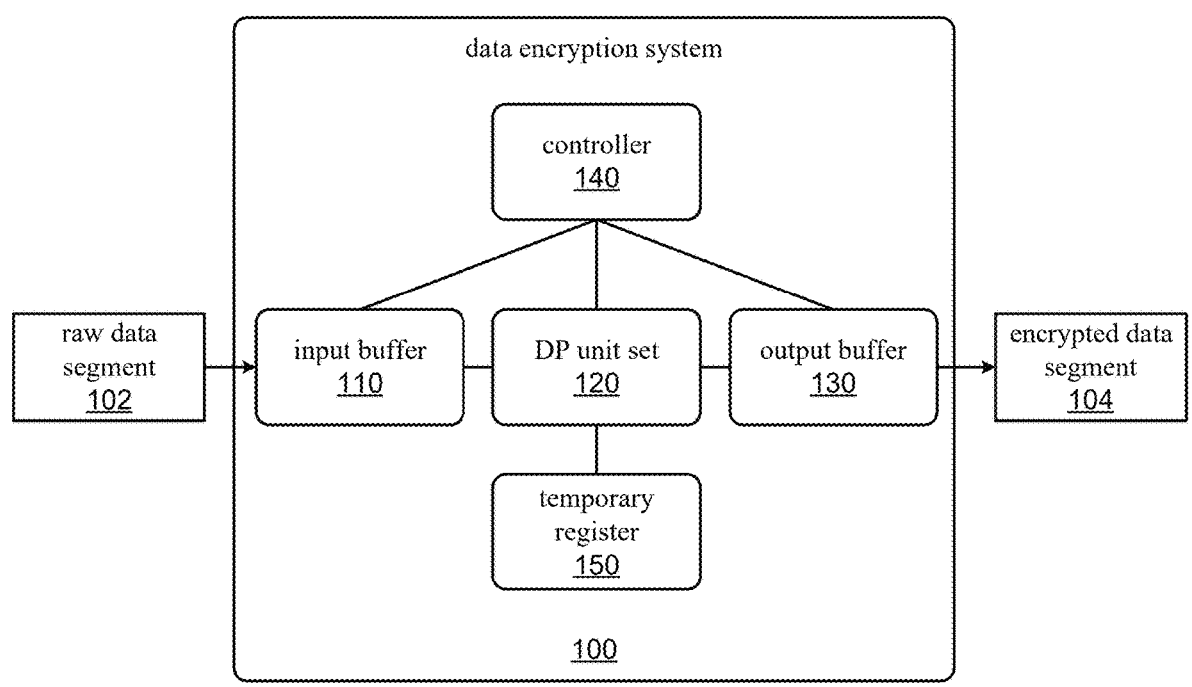
FIG. 1 shows an exemplary data encryption system according to an embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced Encryption Standard (AES) processes are widely used in data encryption. The AES processes have a plurality of working modes, such as an XEX tweakable block cipher with CipherText Stealing (XTS) working mode. The data encryption using AES processing and the XTS working mode may be referred to as XTS-AES data encryption for short. A raw data segment to be encrypted may include a plurality of raw data blocks. A size of an ultimate raw data block in the raw data segment may be smaller than a predetermined data block size specified by the AES process, e.g., 128 bits. In this case, an XTS-AES data encryption scheme may perform specific processing on the last two raw data blocks in the raw data segment. For example, a part of an encrypted data block corresponding to a penultimate (i.e., next-to-last) raw data block is combined with the ultimate raw data block, such that the resulting combined data block conforms to the predetermined data block size. A conventional XTS-AES data encryption scheme adopts a manner in which raw data blocks are processed in sequence, that is, the encryption is performed sequentially according to sequence numbers of the raw data blocks. This would result in that the overall processing need to be paused during the encryption of the penultimate raw data block, and only after the encryption of the penultimate raw data block is completed and the encrypted data block corresponding to the penultimate raw data block is obtained, the processing of the ultimate raw data block may continue. Waiting for the encryption result of the penultimate raw data block will adversely affect data throughput and reduce overall computational efficiency, and as a result, it is difficult for the conventional XTS-AES data encryption scheme to adapt to application scenarios with higher requirements for the data throughput and the computational efficiency.

Various embodiments of a method, system and/or apparatus for data encryption are described herein where the data encryption performs and/or uses AES processing and an XTS working mode. In some embodiments, whether a penultimate (i.e., next-to-last) raw data block in a raw data segment has been written into an input buffer is detected. In response to detecting that the penultimate raw data block has been written into the input buffer, the penultimate raw data block is read from the input buffer for encryption immediately after a current raw data block is read from the input buffer for encryption. After the penultimate raw data block is read from the input buffer for encryption, a subsequent raw data block after the current raw data block continues to be read from the input buffer for encryption. An ultimate raw data block in the raw data segment is encrypted by providing an intermediate encrypted data block, the intermediate encrypted data block is obtained by encrypting the next-to-last raw data block, and the last raw data block is read from the input buffer.

Embodiments of the present disclosure break through a limitation that raw data blocks are sequentially processed in a conventional XTS-AES data encryption scheme; instead, a next-to-last raw data block (i.e., a penultimate raw data block) in a raw data segment is processed in advance during an overall processing of the XTS-AES data encryption. For example, the next-to-last raw data block may be pre-fetched and the encryption of the next-to-last raw data block may be performed in advance during the sequential processing of other raw data blocks. Accordingly, when a last raw data block (ultimate raw data block) is to be processed, an encrypted data block corresponding to the next-to-last raw data block may be directly used, and the encrypted data block is obtained by processing the next-to-last raw data block in advance. For example, when the last raw data block is to be processed, in a case where the encryption of the next-to-last raw data block has been completed, the encrypted data block corresponding to the next-to-last raw data block may be directly used to process the last raw data block, thereby avoiding a waiting time to wait for completing the encryption of the next-to-last raw data block. In addition, for example, when the last raw data block is to be processed, even in a case where the encryption of the next-to-last raw data block has not been completed, since the encryption operation of the next-to-last raw data block has been performed in advance, it is possible to effectively shorten the waiting time to wait for completing the encryption of the next-to-last raw data block. The embodiments of the present disclosure may significantly improve data throughput and computational efficiency by avoiding or shortening the waiting time associated with performing the encryption operation on the next-to-last raw data block. In addition, the embodiments of the present disclosure also propose an improved read operation for an input buffer to more efficiently support the prefetching of the next-to-last raw data block. In addition, the embodiments of the present disclosure also propose an improved write operation for an output buffer in order to write the last two encrypted data blocks more efficiently.

FIG. 1 shows an exemplary data encryption system 100 according to an embodiment. The data encryption system 100 is a system that uses the AES process and the XTS working mode to implement the data encryption, which may also be referred to as an XTS-AES data encryption system.

A data encryption system 100 may be used to perform the encryption on a raw data segment 102 to output an encrypted data segment 104 corresponding to a raw data segment 102. The raw data segment 102 may be an exemplary data segment in a raw data set. By providing a plurality of raw data segments included in the raw data set to the data encryption system 100 for encryption one by one, the encryption of an entire raw data set may be finally achieved. The following description takes the data encryption system 100 to perform the encryption on the exemplary raw data segment 102 in the raw data set as an example.

Data in the raw data segment 102 may be referred to as plaintext. The raw data segment 102 may be divided into a plurality of raw data blocks according to a predetermined data block size, such as 128 bits, specified by the AES process. Each raw data block may also be referred to as a plaintext data block. A size of the last raw data block in the raw data segment 102 may be smaller than the predetermined data block size, for example, the size of the last raw data block may be between 1 bit and 127 bits. In this case, XTS-AES data encryption may perform specific processing on the last two raw data blocks in the raw data segment 102. Data in the encrypted data segment 104 may be referred to as ciphertext. The encrypted data segment 104 may include a plurality of encrypted data blocks corresponding to the plurality of raw data blocks in the raw data segment 102, respectively. Each encrypted data block may also be referred to as a ciphertext data block.

The data encryption system 100 may include, for example, an input buffer 110, a Data Processing (DP) unit set 120, an output buffer 130, a controller 140, a temporary register 150, and the like.

The input buffer 110 is used to store the raw data blocks in the raw data segment 102. In an aspect, the plurality of raw data blocks in the raw data segment 102 may be sequentially written into the input buffer 110 through an input buffer write processing for the input buffer 110. The input buffer 110 may include a plurality of storage areas respectively corresponding to the plurality of raw data blocks in the raw data segment 102. Each storage area stores one raw data block. Exemplarily, consecutive sequence numbers may be assigned to the plurality of raw data blocks in the raw data segment 102, such that each raw data block may be sequentially written into the corresponding storage area in the input buffer 110 according to an order of the sequence numbers. In another aspect, the raw data blocks may be read from the input buffer 110 for encryption through an input buffer read processing for the input buffer 110. The plurality of raw data blocks stored in the input buffer 110 may be read one by one. According to the embodiments of the present disclosure, during the sequential reading of other raw data blocks, the next-to-last raw data block may be pre-fetched. For example, although the currently read raw data block is not a raw data block immediately preceding the next-to-last raw data block, the next-to-last raw data block may be read immediately after the current raw data block is read, such that the encryption may be performed on the next-to-last raw data block in advance. In an implementation, the input buffer 110 may be an improved First-In-First-Out (FIFO) buffer. For example, the input buffer 110 may be an improved version of a conventional FIFO buffer to support at least the prefetching of the next-to-last raw data block.

The DP unit set 120 is used to perform the encryption processing. The DP unit set 120 may include a plurality of DP units. Each DP unit may be configured to enable the execution of a total number of operation rounds required for the encryption. For example, assuming that a total 14 of operation rounds (that is, the number of operation rounds is 14) is required to be executed for the encryption of each data block, then each DP unit may perform all the 14 of operation rounds. Accordingly, each DP unit may independently encrypt an input data block into an encrypted data block corresponding to the input data block. Assuming that each operation round may be completed within one clock cycle, each DP unit may complete the encryption operation for one input data block through 14 clock cycles. It should be understood that the embodiments of the present disclosure are not limited to employing any particular type of DP unit, as long as the DP unit is capable of performing the total number of operation rounds required for the encryption to encrypt the input data block into the encrypted data block corresponding to the input data block.

For each raw data block preceding the next-to-last raw data block, the corresponding DP unit may encrypt the raw data block into an encrypted data block corresponding to the raw data block for further storage into an output buffer 130.

For the next-to-last raw data block, the corresponding DP unit may encrypt the next-to-last raw data block into a corresponding intermediate encrypted data block, and the intermediate encrypted data block is stored in the temporary register 150 rather than the output buffer 130. For each raw data block before the last raw data block, the raw data block may be used as the input data block of the corresponding DP unit. However, for the last raw data block, the input data block of the corresponding DP unit is a combined data block composed of the last raw data block and a part of the intermediate encrypted data block, and the DP unit encrypts the combined data block into an encrypted data block corresponding to the combined data block for further storage into the output buffer 130. In addition, a part of the intermediate encrypted data block that is not used to form the combined data block is further stored in the output buffer 130 as an independent encrypted data block.

The output buffer 130 is used to store the encrypted data blocks corresponding to the raw data blocks. In an aspect, the plurality of encrypted data blocks obtained by the DP unit set 120 may be sequentially written into the output buffer 130 through an output buffer write processing for the output buffer 130. The output buffer 130 may include a plurality of storage areas respectively corresponding to the plurality of encrypted data blocks. Each storage area stores one encrypted data block. Exemplarily, the consecutive sequence numbers may be assigned to the plurality of encrypted data blocks, such that each encrypted data block may be sequentially written into the corresponding storage area in the output buffer 130 according to the order of the sequence numbers. In an implementation, the specific write processing may be performed on the last two encrypted data blocks. For example, the encrypted data block obtained for the combined data block composed of the last raw data block and a part of the intermediate encrypted data block may be written into the next-to-last storage area in the output buffer 130, while a part of the intermediate encrypted data block that is not used to form the combined data block is written into the last storage area in the output buffer 130 as a separate encrypted data block. Preferably, the last two encrypted data blocks may be simultaneously written into the last two storage areas in the output buffer 130 through a predetermined operation on a write pointer. In another aspect, the encrypted data blocks may be read from the output buffer 130 for output by an output buffer read processing for the output buffer 130. The plurality of encrypted data blocks stored in the output buffer 130 may be read one by one. The plurality of encrypted data blocks read will form the encrypted data segment 104. In an implementation, the output buffer 130 may be the improved FIFO buffer. For example, the output buffer 130 may be the improved version of the conventional FIFO buffer to support at least the simultaneous writing of the last two encrypted data blocks.

The controller 140 may implement various controls and managements of the input buffer 110, the DP unit set 120, the output buffer 130, the temporary register 150, and the like. The controller 140 may be implemented at least by various processing units such as a processor, a state machine, etc., and the processing unit may implement a specific control and management logic by executing corresponding computer program codes or instructions stored in a storage unit. The embodiments of the present disclosure are not limited to any particular hardware and/or software technology for implementing the controller 140.

In an implementation, the controller 140 may detect whether the next-to-last raw data block in the raw data segment 102 has been written into the input buffer 110. For example, the controller 140 may continuously check the storage area in the input buffer 110 corresponding to the next-to-last raw data block to determine whether the next-to-last raw data block has been already contained in the storage area.

In an implementation, if the controller 140 has detected that the next-to-last raw data block has been written into the input buffer 110, the controller 140 may trigger the prefetching of the next-to-last raw data block, for example, the next-to-last raw data block is read from the input buffer 110 for encryption, immediately after the current raw data is read from the input buffer 110 for encryption. Preferably, when detecting that the next-to-last raw data block has been written into the input buffer 110, the controller 140 may further calculate a sequence number difference between a sequence number of the next-to-last raw data block and a sequence number of the current raw data block, and in a case where the sequence number difference is not greater than the number of operation rounds required for encryption, the controller 140 may trigger the reading of the next-to-last raw data block from the input buffer 110. Assuming that one raw data block is read at every 1 clock cycle, the sequence number difference may be used to estimate the waiting time required until the last raw data block is to be processed. For example, if the sequence number difference is equal to the number of operation rounds required for encryption, when the last raw data block is to be processed, the encryption of the next-to-last raw data block is just completed, thereby avoiding the waiting time. For example, if the sequence number difference is less than the number of operation rounds required for encryption, when the last raw data block is to be processed, the waiting time may be, for example, indicated by a difference value obtained by subtracting the sequence number difference from the number of operation rounds required for encryption. Therefore, by immediately reading the next-to-last raw data block in a case where the sequence number difference is not greater than the number of operation rounds required for encryption, the waiting time may be effectively avoided or reduced as much as possible. It should be understood that if the sequence number difference is greater than the number of operation rounds required for encryption, it indicates that the encryption of the next-to-last raw data block has been completed in advance at a specific time before the last raw data block is to be processed. The amount of advanced time may be indicated, for example, by the difference value obtained by subtracting the number of operation rounds required for encryption from the sequence number difference. In the case where the sequence number difference is greater than the number of operation rounds required for encryption, the next-to-last raw data block may also be read immediately, or alternatively, the next-to-last raw data block is not read until a sequence number difference calculated later is not greater than the number of operation rounds required for encryption.

In an implementation, after the next-to-last raw data block is read from the input buffer 110 for encryption, the controller 140 may control to continue reading the subsequent raw data blocks after the current raw data block from the input buffer 110 for encryption. The subsequent raw data blocks may refer to raw data blocks with a series of sequence numbers immediately following the sequence number of the current raw data block.

In an implementation, the controller 140 may provide the intermediate encrypted data block to encrypt the last raw data block, and the intermediate encrypted data block is obtained by encrypting the next-to-last raw data block. For example, the controller 140 may read the intermediate encrypted data block from the temporary register 150 in order to use it for the encryption of the last raw data block.

In an implementation, the controller 140 may use the last raw data block and a part of the intermediate encrypted data block to form the combined data block.

In an implementation, the controller 140 may simultaneously write the last two encrypted data blocks to the last two storage areas in the output buffer 130 through the predetermined operation on the write pointer. For example, the controller 140 may support the simultaneous writing of the last two encrypted data blocks to the output buffer 130 by incrementing the write pointer by 2.

It should be understood that the above descriptions of the various components included in the data encryption system 100 are exemplary, and that the embodiments of the present disclosure may encompass various variations of the operations or processes performed by the various components in the data encryption system 100, and may include more or less detail. For example, preferably, a depth of the input buffer 110 and a depth of the output buffer 130 may be set to be the same, that is, the number of storage areas included in the input buffer 110 is the same as the number of storage areas included in the output buffer 130, and correspondingly, the number of raw data blocks in the raw data segment 102 is the same as the number of encrypted data blocks in the encrypted data segment 104. For example, preferably, both the depth of the input buffer 110 and the depth of the output buffer 130 may be set to be larger than the number of operation rounds required for encryption, in order to achieve optimal utilization of the DP unit and avoid the additional waiting time caused due to the depths of the input buffer and the output buffer being less than the number of operation rounds required for encryption. For example, preferably, the number of the plurality of DP units in the DP unit set 120 may be set equal to the number of operation rounds required for encryption, in order to achieve the optimal utilization of the DP unit. Furthermore, it should be appreciated that while the above describes an exemplary number or magnitude relationship between the depths of the input buffer and the output buffer, the number of operation rounds required for encryption, and the number of DP units, etc., the embodiments of the present disclosure are not limited to these exemplary descriptions, but may also achieve the purpose of avoiding or shortening the waiting time associated with performing the encryption operation on the next-to-last raw data block so as to improve the data throughput and the computational efficiency in a case where there are any other number or magnitude relationship between the depths of the input buffer and the output buffer, the number of operation rounds required for encryption, and the number of DP units, etc.

Figure 2:
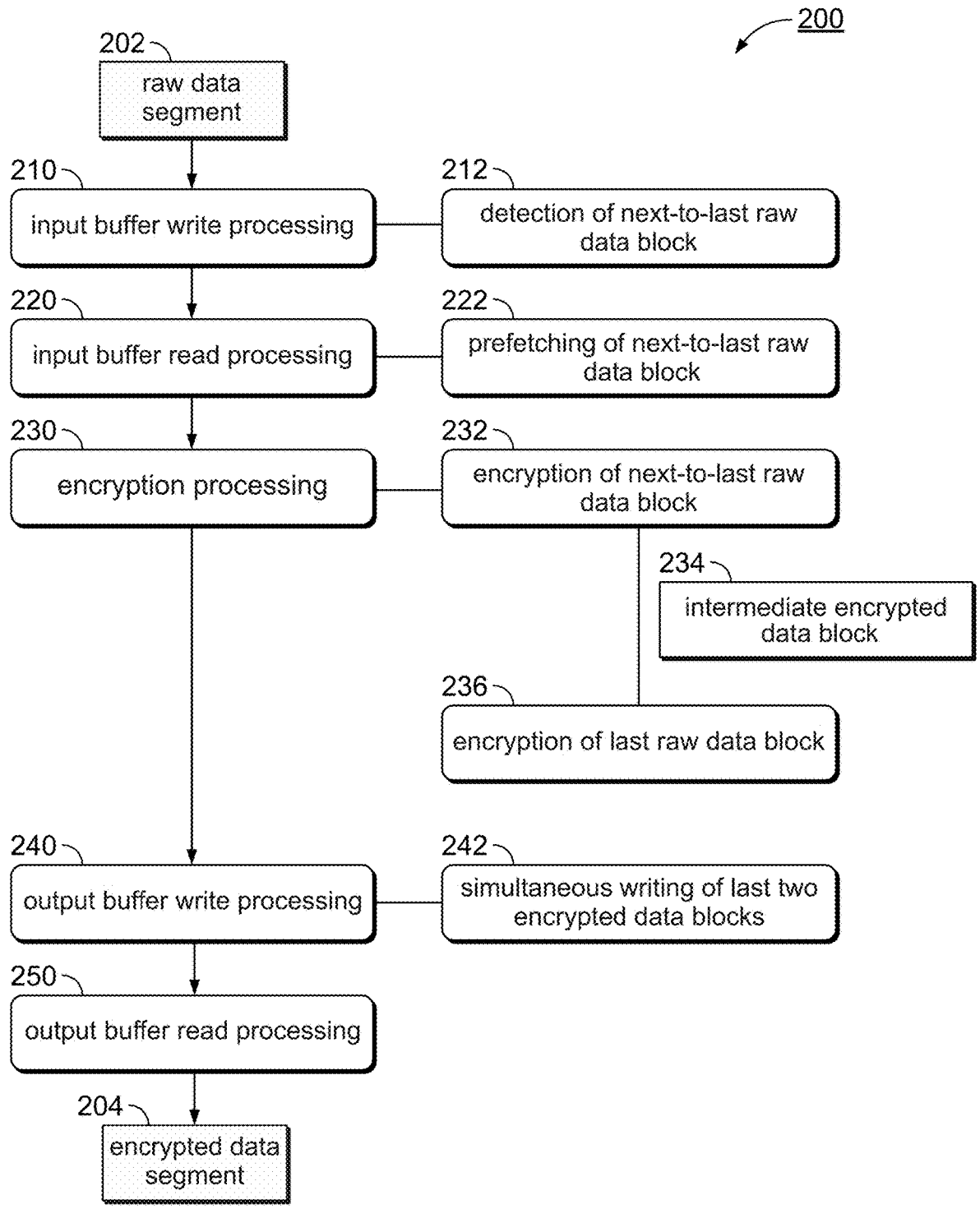
FIG. 2 shows an exemplary process for data encryption according to an embodiment.

FIG. 2 shows an exemplary process 200 for data encryption according to an embodiment. The process 200 is, for example, an exemplary illustration of the operations and processing performed by the data encryption system 100 in FIG. 1. Furthermore, all or some of the steps and operations involved in the process 200 may be performed, for example, under the control of the controller 140 in FIG. 1. It is assumed that it is intended to obtain an encrypted data segment 204 corresponding to a raw data segment 202 by performing the process 200.

At 210, the input buffer write processing may be performed. For example, raw data blocks in the raw data segment 202 may be sequentially written into the input buffer.

In an implementation, during the execution of the input buffer write processing, at 212, whether the next-to-last raw data block in the raw data segment 202 has been written into the input buffer may be detected.

At 220, the input buffer read processing may be performed. For example, the raw data blocks may be read from the input buffer for encryption. The plurality of raw data blocks stored in the input buffer may be read one by one.

In an implementation, the input buffer read processing at 220 may include at least prefetching, at 222, the next-to-last raw data block. For example, in response to detecting that the next-to-last raw data block has been written into the input buffer at 212, the next-to-last raw data block may be read from the input buffer for encryption immediately after the current raw data block is read from the input buffer for encryption. Preferably, the prefetching of the next-to-last raw data block may be implemented at least by means of a read pointer operation for the input buffer. For example, in response to detecting that the next-to-last raw data block has been written into the input buffer, an array of raw data blocks in the input buffer may be rearranged, where the next-to-last raw data block may be moved to a position in the input buffer immediately following the current raw data block, that is, the next-to-last raw data block is inserted between the current raw data block and the next raw data block adjacent to the current raw data block in terms of the sequence number. After the rearrangement, the reading of the raw data from the input buffer may continue by iteratively updating the read pointer. First, after the current raw data block is read, the read pointer pointing to the current raw data block may be updated, such that the updated read pointer points to the next-to-last raw data block, and the next-to-last raw data block may be read based on the updated read pointer. Subsequent raw data blocks after the current raw data block may then be read through further iterative updates of the read pointer. For example, the updated read pointer for reading the next-to-last raw data block may be iteratively updated, such that the iteratively updated read pointers respectively point to each of the subsequent raw data blocks in sequence, and each of the subsequent raw data blocks may be read in sequence based on the iteratively updated read pointer. The iterative updating of the read pointer may refer, for example, to incrementing the read pointer by 1 each time. In an implementation, preferably, the prefetching of the next-to-last raw data block at 222 may further adopt a determination condition defined by using the sequence number difference and the number of operation rounds required for encryption. For example, in response to detecting that the next-to-last raw data block has been written into the input buffer, the sequence number difference between the sequence number of the next-to-last raw data block and the sequence number of the current raw data block may be calculated, and in a case where it is determined that the sequence number difference is not greater than the number of operation rounds required for encryption, the next-to-last raw data block is read from the input buffer.

At 230, the encryption processing may be performed to encrypt the raw data blocks read from the input buffer into the encrypted data blocks corresponding to the raw data blocks. Encryption may be performed using, for example, the DP units in the DP unit set 120 in FIG. 1.

In an implementation, the encryption processing at 230 may include at least performing, at 232, the encryption on the next-to-last raw data block to obtain an intermediate encrypted data block 234. The intermediate encrypted data block 234 may be stored in the temporary register. The encryption processing at 230 may further include at least performing, at 236, the encryption on the last raw data block. The intermediate encrypted data block may be provided for encryption of the last raw data block. For example, a previously stored intermediate encrypted data block may be read from the temporary register and used to encrypt the last raw data block. The combined data block may be formed using the last raw data block and a part of the intermediate encrypted data block, and the combined data block may be encrypted into the encrypted data block corresponding to the combined data block.

At 240, the output buffer write processing may be performed to write the encrypted data block obtained by the encryption processing at 230 into the output buffer.

In an implementation, preferably, the output buffer write processing at 240 may include at least performing, at 242, a simultaneous writing of the last two encrypted data blocks. The last two encrypted data blocks include the encrypted data block corresponding to the combined data block and the encrypted data block formed by a part of the intermediate encrypted data block that is not used to form the combined data block. The simultaneous writing of the last two encrypted data blocks to the output buffer may be supported by, for example, incrementing the write pointer by 2 every time, such that after the write operation is ended, the write pointer correctly points to the last encrypted data block.

At 250, the output buffer read processing may be performed to sequentially read the encrypted data blocks from the output buffer. For example, the plurality of encrypted data blocks in the output buffer may be read sequentially using the iterative updates of the read pointer. The read encrypted data blocks may together form the encrypted data segment 204.

It should be understood that all operations or steps in the process 200 described above in conjunction with FIG. 2 are exemplary, and depending on specific application scenarios and requirements, the process 200 may include more or less operations or steps, and the embodiments of the present disclosure will encompass modifications made to the process 200 in any manner.

Figure 3:
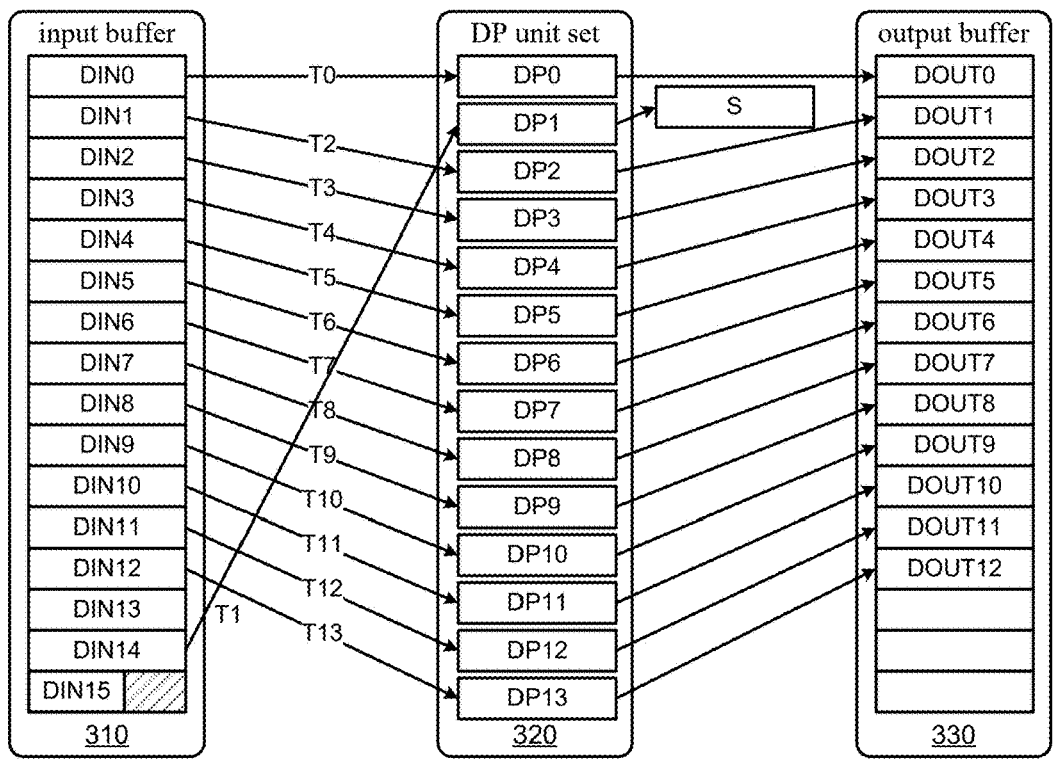
FIG. 3 shows an instance of performing data encryption according to an embodiment.
Figure 3:
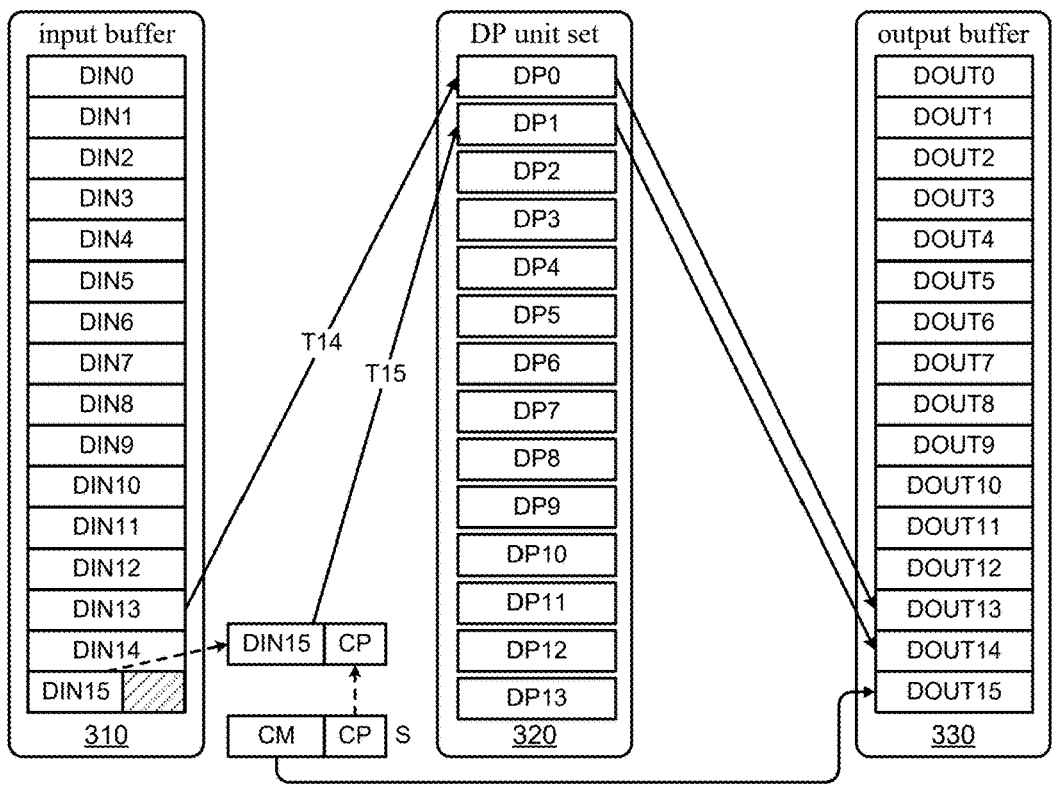

FIG. 3 shows an instance 300 of performing data encryption according to an embodiment. The instance 300 is presented based on an XTS-AES-256 data encryption scheme which may refer to XTS-AES data encryption with a key length of 256 bits. In the XTS-AES-256 data encryption, 14 operation rounds are required for the encryption of each data block, and correspondingly, one DP unit needs 14 clock cycles to complete the encryption of one input data block. In the instance 300, the number of DP units in a DP unit set 320 is set to be the same as the number of operation rounds (i.e., 14 rounds) required for encryption, that is, the DP unit set 320 includes 14 DP units DP0-DP13. Furthermore, in the instance 300, a depth of an input buffer 310 and a depth of an output buffer 330 are both set to 16, which is greater than the number of operation rounds (i.e., 14 rounds) required for encryption or the number of DP units (i.e., 14).

It is assumed that 16 raw data blocks in the raw data segment are sequentially written in the input buffer 310, and their sequence numbers are DIN0 to DIN15, where DIN0 represents a first raw data block, DIN14 represents the next-to-last raw data block and DIN15 represents the last raw data block. As shown, a size of the last raw data block DIN15 is smaller than the predetermined data block size specified by the AES process, such that only a part of the corresponding storage area is filled, and the remaining part of the storage area is not filled, as shown by a shaded area.

The raw data blocks may be read from the input buffer 310 for encryption. At time T0, DIN0 is read and provided to DP0 for encryption. After DP0 completes the encryption of DIN0, the resulting corresponding encrypted data block DOUT0 is written into an output buffer 330.

While the input buffer 310 is being read, whether the next-to-last raw data block DIN14 has been written into the input buffer 310 may be detected. Assuming that at time T0, it is detected that DIN14 has been written into the input buffer 310, while DIN0 is the current raw data block. In response to detecting that DIN14 has been written into the input buffer 310, DIN14 is read from the input buffer 310 for encryption at the next time T1 immediately after the current raw data block DIN0 is read from the input buffer 310 for encryption, that is, immediately after time T0. DIN14 is provided to DP1 for encryption. After DP1 completes the encryption of DIN14, the resulting corresponding intermediate encrypted data block S is stored in the temporary register (not shown). It should be understood that, optionally, in response to detecting that DIN14 has been written into the input buffer 310, a sequence number difference between the sequence number DIN14 of the next-to-last raw data block and the sequence number DIN0 of the current raw data block may be calculated as 14. Then, in response to the sequence number difference 14 being not greater than the number of operation rounds required for encryption (i.e., 14 rounds), it is determined to read DIN14 from the input buffer at time T1.

After DIN14 is read from the input buffer 310, the reading of the subsequent raw data blocks DIN1 to DIN13 and DIN15 after the current raw data block DIN0 from the input buffer 310 may be continue for encryption. For example, the raw data blocks DIN1 to DIN12 are respectively read at times T2 to T13 in sequence, and DP2 to DP13 are used to encrypt DIN1 to DIN12, respectively, and the resulting corresponding encrypted data blocks DOUT1 to DOUT12 are written into the output buffer 330, respectively.

In the instance 300, each time instant corresponds to 1 clock cycle, and when time T14 arrives, DP0 has just completed 14 rounds of encryption operations performed on DIN0 within 14 clock cycles. Thus, at time T14, DIN13 may be read and provided to DP0 for encryption. After DP0 completes the encryption of DIN13, the resulting corresponding encrypted data block DOUT13 is written into the output buffer 330.

When time T15 arrives, DP1 has just completed 14 rounds of encryption operations performed on DIN14 within 14 clock cycles. Thus, at time T15, the last raw data block DIN15 may be read, and the intermediate encrypted data block S may be used in the processing of DIN15. For example, the intermediate encrypted data block S may be divided into two parts CM and CP, where a size of CM corresponds to the size of DIN15, and a sum of the size of CP and the size of DIN15 is exactly equal to the predetermined data block size specified by the AES process. DIN15 and the part CP in the intermediate encrypted data block S may be combined to form the combined data block, and the combined data block is provided to DP1 at time T15. After DP1 completes the encryption of the combined data block, the resulting corresponding encrypted data block DOUT14 is written into the output buffer 330. In addition, the part CM in the intermediate encrypted data block S will be written into the output buffer 330 as an independent encrypted data block DOUT15.

According to the instance 300, when the last raw data block DIN15 is to be processed, the encryption of the next-to-last raw data block DIN14 has just been completed and the intermediate encrypted data block S may be directly used in the processing of DIN15. Thus, the waiting time to wait for completing the encryption of DIN14 when DIN15 is to be processed is avoided. That is, after time T14, the combined data block may be formed directly at time T15 for encryption without waiting time. At least thanks to setting the number of DP units to be the same as the number of operation rounds required for encryption, the avoidance of the waiting time may be achieved.

It should be understood that all details in the instance 300 are exemplary and the embodiments of the present disclosure will encompass the modifications made to the instance 300 in any manner. For example, instead of setting the depths of the input buffer 310 and the output buffer 330 as 16, the depths of the input buffer 310 and the output buffer 330 may also be set to other values. For example, instead of setting the number of DP units to be the same as the number of operation rounds required for encryption, it is also possible to set a larger number of DP units than the number of operation rounds required for encryption, which will also help avoid the waiting time. For example, instead of setting the number of DP units to be the same as the number of operation rounds required for encryption, it is also possible to set a smaller number of DP units than the number of operation rounds required for encryption, although this may result in some waiting time, the waiting time is still effectively shortened compared to the existing XTS-AES data encryption thanks to the prefetching of the next-to-last raw data block.

Furthermore, it should be understood that the instance 300 is presented based on the XTS-AES-256 data encryption scheme. Alternatively, if the XTS-AES data encryption uses a 128-bit length key or a 192-bit length key, the number of operation rounds required for encryption will be 10 and 12, respectively, and corresponding, the number of DP units may be preferably set to 10 and 12, respectively.

Figure 4:
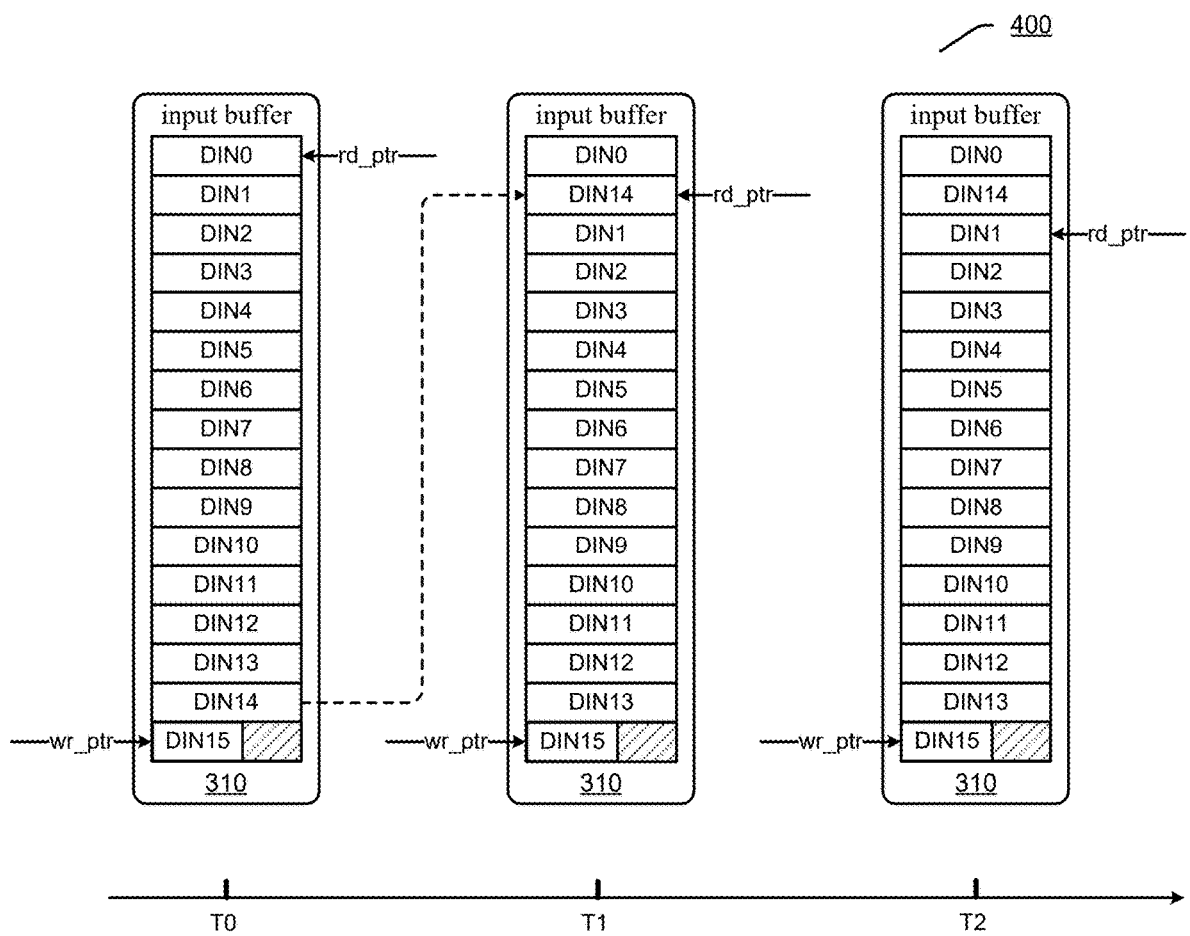
FIG. 4 shows an example of a pointer operation for an input buffer according to an embodiment.

FIG. 4 shows an example 400 of a pointer operation for an input buffer according to an embodiment. The example 400 is a further implementation for the write processing and the read processing for the input buffer 310 in FIG. 3.

In an aspect, a write pointer wr_ptr may be used to implement the sequential writing of the plurality of raw data blocks in the raw data segment into the input buffer 310. For example, the plurality of raw data blocks DIN0 to DIN15 may be sequentially written by iteratively updating the write pointer. The iterative update of the write pointer may be, for example, incrementing the write pointer by 1 each time. As shown, the last raw data block DIN15 has been written into the input buffer 310, while the write pointer remains pointing to DIN15.

In another aspect, a read pointer rd_ptr may be used to implement the reading of the raw data block from the input buffer 310. At time T0, the read pointer points to DIN0, such that DIN0 may be read using the read pointer. Assuming that at time T0, it is detected that the next-to-last raw data block DIN14 has been written into the input buffer 310, while DIN0 is the current raw data block. To pre-fetch DIN14 using the write pointer, the array of raw data blocks in the input buffer 310 may be rearranged. As shown, at time T1, DIN14 has been moved to a position immediately after the current raw data block DIN0, i.e., DIN14 is inserted between DIN0 and DIN1. Meanwhile, after DIN0 has been read at time T0, the read pointer that previously pointed to DIN0 is updated to point to DIN14 at time T1. Thus, at time T1, DIN14 may be read based on this updated read pointer.

After DIN14 has been read at time T1, the read pointer at time T1 may be updated iteratively, such that the iteratively updated read pointer respectively point to each of the subsequent raw data blocks DIN1-DIN13 and DIN15 with sequence numbers immediately after DIN0 in sequence, and each of these subsequent raw data blocks may be read in sequence based on the iteratively updated read pointer. Taking time T2 as an example, the read pointer has been updated to point to DIN1, such that at time T2, DIN1 may be read based on the read pointer, and so on.

It should be understood that the implementation of prefetching the next-to-last raw data block given in the example 400 is only exemplary, and the embodiments of the present disclosure are not limited to any detail in the example 400, but any modification of the example 400 and any other implementation of prefetching the next-to-last raw data block may be encompassed.

Figure 5:
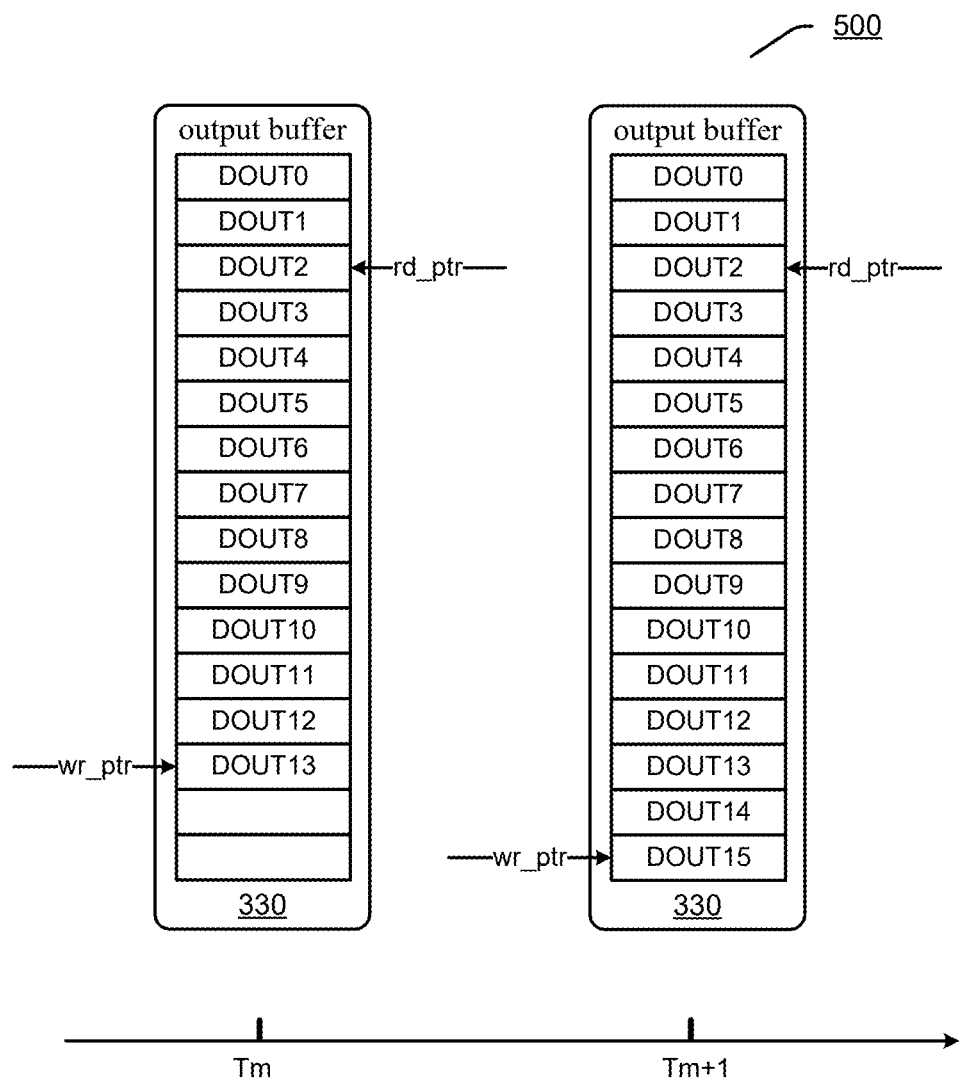
FIG. 5 shows an example of a pointer operation for an output buffer according to an embodiment.

FIG. 5 shows an example 500 of a pointer operation for an output buffer according to an embodiment. The example 500 is a further implementation of the write processing and the read processing for the output buffer 330 in FIG. 3.

In an aspect, the write pointer wr_ptr may be used to implement the writing of the encrypted data block into the output buffer 330. The encrypted data blocks DOUT0 to DIN13 may be sequentially written through the iterative update of the write pointer. During the writing of DOUT0 to DIN13, the iterative update of the write pointer may be, for example, incrementing the write pointer by 1 each time. As shown, at time Tm, DOUT13 has been written into the output buffer 330. At this time, the write pointer points to DOUT13.

Preferably, in order to improve the writing efficiency, the last two encrypted data blocks DOUT14 and DOUT15 may be written simultaneously. For example, the write pointer at time Tm may be directly incremented by 2, such that after both DOUT14 and DOUT15 have been written simultaneously at time Tm+1, the write pointer is updated to point to DOUT15.

In another aspect, the read pointer rd_ptr may be used to implement the reading of the encrypted data block from the output buffer 330. For example, the encrypted data blocks DOUT0 to DIN15 may be sequentially read from the output buffer 330 by iteratively updating the read pointer. The iterative update of the read pointer may be, for example, incrementing the read pointer by 1 each time.

It should be understood that the implementation of writing the last two encrypted data blocks at the same time given in the example 500 is only exemplary, and the embodiments of the present disclosure are not limited to any detail in the example 500, but any modification of the example 500 may be encompassed. For example, instead of writing the last two encrypted data blocks at the same time, the last two encrypted data blocks may be written one by one, in which case the write pointer is updated by incrementing by 1.

Furthermore, it should be understood that in the above description in conjunction with the example 400 of FIG. 4 and the example 500 of FIG. 5, the write operation may also broadly refer to a push operation, and the read operation may also broadly refer to a pull operation.

Figure 6:
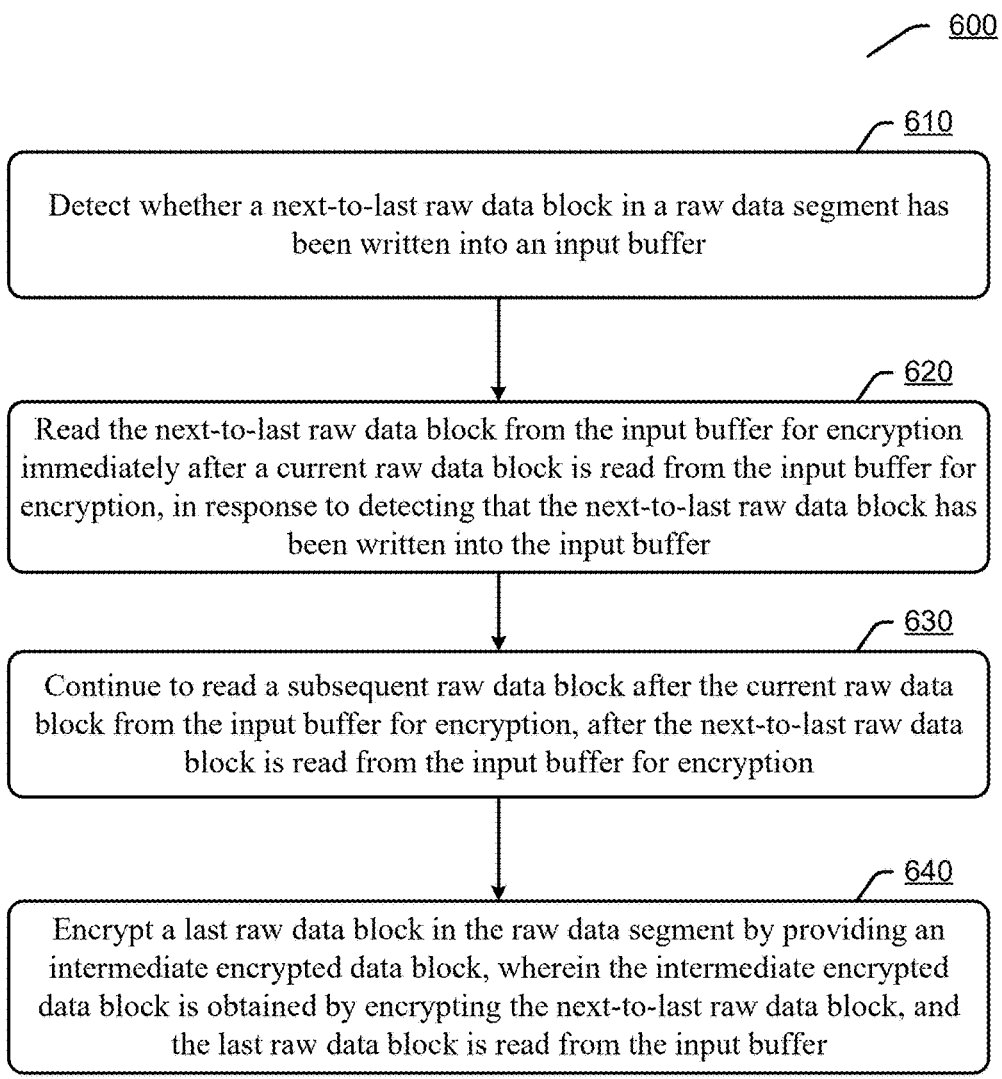
FIG. 6 shows a flowchart of an exemplary method for data encryption according to an embodiment.

FIG. 6 shows a flowchart of an exemplary method 600 for data encryption according to an embodiment. In this example, the data encryption uses and/or incorporates AES processing and the XTS working mode.

At 610, whether a next-to-last raw data block in a raw data segment has been written into an input buffer may be detected.

At 620, in response to detecting that the next-to-last raw data block has been written into the input buffer, the next-to-last raw data block may be read from the input buffer for encryption immediately after a current raw data block is read from the input buffer for encryption.

At 630, after the next-to-last raw data block is read from the input buffer for encryption, a subsequent raw data block after the current raw data block may continue to be read from the input buffer for encryption.

At 640, an intermediate encrypted data block may be provided to encrypt a last raw data block in the raw data segment read from the input buffer, and the intermediate encrypted data block is obtained by encrypting the next-to-last raw data block.

In an implementation, the reading the next-to-last raw data block may include: moving the next-to-last raw data block to a position in the input buffer immediately after the current raw data block; after the current raw data block is read, updating a read pointer pointing to the current raw data block, such that the next-to-last raw data block is pointed to by the updated read pointer; and reading the next-to-last raw data block based on the updated read pointer.

The reading the subsequent raw data block after the current raw data block may include: iteratively updating the updated read pointer, such that each subsequent raw data block is respectively pointed to by the iteratively updated read pointer in sequence; and sequentially reading each subsequent raw data block based on the iteratively updated read pointer.

In some embodiments, the reading the next-to-last raw data block may include: calculating a sequence number difference between a sequence number of the next-to-last raw data block and a sequence number of the current raw data block; and in response to the sequence number difference being not greater than the number of operation rounds required for encryption, reading the next-to-last raw data block from the input buffer.

In some embodiments, the method 600 may further include: storing the intermediate encrypted data block in a temporary register. The providing the intermediate encrypted data block may include: reading the intermediate encrypted data block from the temporary register.

In some embodiments, the method 600 may further include: providing each raw data block read from the input buffer to one DP unit. The DP unit may be configured to encrypt the input data blocks into the encrypted data blocks corresponding to the input data blocks by performing a total number of operation rounds required for encryption.

In some embodiments, the method 600 may further include: simultaneously writing last two encrypted data blocks to an output buffer by incrementing a write pointer by 2.

In some embodiments, a size of the last raw data block is smaller than a predetermined data block size specified by the AES process.

It should be understood that the method 600 may also include any other steps and/or processes for data encryption according to the embodiments of the present disclosure described above.

Figure 7:
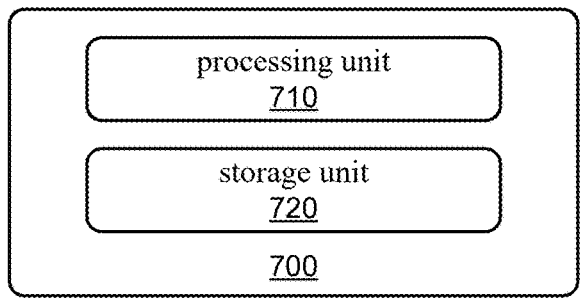
FIG. 7 shows an exemplary apparatus for data encryption according to an embodiment.

FIG. 7 shows an exemplary apparatus 700 for data encryption according to an embodiment.

The apparatus 700 may include at least one processing unit 710. The apparatus 700 may further include a storage unit 720 connected to the at least one processing unit 710. The storage unit 720 may store computer-executable instructions that, when executed, cause the at least one processing unit 710 to perform any operation and step of the method for data encryption according to the embodiments of the present disclosure described above.

The embodiments of the present disclosure further propose a system for implementing data encryption, and the data encryption adopts the AES process and the XTS working mode. The system may include: an input buffer, configured to store a raw data block in a raw data segment; a DP unit set including a plurality of DP units, each DP unit configured to encrypt an input data block into an encrypted data block corresponding to the input data block by performing a total number of operation rounds required for encryption; an output buffer, configured to store an encrypted data block corresponding to the raw data block; and a controller. The controller may be configured to: detect whether a next-to-last raw data block in the raw data segment has been written into the input buffer; in response to detecting that the next-to-last raw data block has been written into the input buffer, read the next-to-last raw data block from the input buffer for encryption immediately after a current raw data block is read from the input buffer for encryption; continue to read a subsequent raw data block after the current raw data block from the input buffer for encryption after the next-to-last raw data block is read from the input buffer for encryption; and provide an intermediate encrypted data block to encrypt a last raw data block in the raw data segment read from the input buffer, the intermediate encrypted data block being obtained by encrypting the next-to-last raw data block. The system may further include a temporary register, configured to store the intermediate encrypted data block. Preferably, a depth of the input buffer and a depth of the output buffer are the same, and both the depth of the input buffer and the depth of the output buffer are greater than the number of operation rounds required for encryption. Preferably, the number of the plurality of DP units is equal to the number of operation rounds required for encryption. In addition, the controller may also perform any other operation and step of the method for data encryption according to the embodiments of the present disclosure described above.

The embodiments of the present disclosure further propose an apparatus for data encryption, and the data encryption adopts AES processing and the XTS working mode. The apparatus may include: a detection module, configured to detect whether a next-to-last raw data block in the raw data segment has been written into the input buffer; a next-to-last raw data block reading module, configured to, in response to detecting that the next-to-last raw data block has been written into the input buffer, read the next-to-last raw data block from the input buffer for encryption immediately after a current raw data block is read from the input buffer for encryption; a subsequent raw data block reading module, configured to continue to read a subsequent raw data block after the current raw data block from the input buffer for encryption after the next-to-last raw data block is read from the input buffer for encryption; and an intermediate encrypted data block providing module, configured to provide an intermediate encrypted data block to encrypt a last raw data block in the raw data segment read from the input buffer, and the intermediate encrypted data block being obtained by encrypting the next-to-last raw data block. Furthermore, the apparatus may further include any other module configured to perform any step/process of the method for data encryption according to the embodiments of the present disclosure described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled to the processor and configured to provide the processor with instructions which when executed cause the processor to:
      detect whether a next-to-last raw data block in a raw data segment has been written into an input buffer;
      calculate a sequence number difference between a sequence number of the next-to-last raw data block and a sequence number of a current raw data block;
      determine whether the sequence number difference exceeds a number of operation rounds associated with encryption; and
      in response to: (1) detecting that the next-to-last raw data block has been written into the input buffer and (2) determining that the sequence number difference does not exceed the number of operation rounds associated with encryption, trigger a read of the next-to-last raw data block from the input buffer;
      encrypt, out of a sequence number order and using Advanced Encryption Standard (AES) processing and a CipherText Stealing (XTS) working mode, the next-to-last raw data block to produce a next-to-last encrypted data block; and
      encrypt, using the AES processing and the XTS working mode, a last raw data block in the raw data segment using the next-to-last encrypted data block.

2. The system recited in claim 1, wherein the detection that the next-to-last raw data block has been written into the input buffer triggers calculating the sequence number difference.

3. The system recited in claim 1, wherein the read of the next-to-last raw data block includes:
   moving the next-to-last raw data block to a position immediately after the current raw data block in the input buffer;
   pointing an updating read pointer to the next-to-last raw data block by updating a read pointer pointing to the current raw data block after the current raw data block is read; and
   reading the next-to-last raw data block using the updated read pointer.

4. The system recited in claim 3, wherein reading the next-to-last raw data block using the updated read pointer includes:
   iteratively updating the updated read pointer to point to each subsequent raw data block to produce an iteratively updated read pointer; and
   reading said each subsequent raw data block using the iteratively updated read pointer.

5. The system recited in claim 1, wherein encrypting the last raw data block includes using an intermediate encrypted data block that is read from a temporary register.

6. The system recited in claim 1, wherein an encoder includes a plurality of Data Processing (DP) units, wherein:
   a given raw data block is passed from the input buffer to a corresponding DP unit in the plurality of DP units; and
   the corresponding DP unit encrypts the given raw data block by performing the number of operation rounds associated with encryption.

7. The system recited in claim 1, further including an output buffer, wherein the next-to-last encrypted data block and a last encrypted data block are simultaneously written to the output buffer.

8. The system recited in claim 1, further including an output buffer, wherein the next-to-last encrypted data block and a last encrypted data block are simultaneously written to the output buffer, including by incrementing a write pointer by 2.

9. The system recited in claim 1, further including an output buffer, wherein a plurality of encrypted data blocks generated by an encoder is sequentially written into the output buffer.

10. The system recited in claim 1, wherein a size of the last raw data block is strictly smaller than a predetermined data block size specified by the AES processing.

11. A method, comprising:
    detecting whether a next-to-last raw data block in a raw data segment has been written into an input buffer;
    using a controller to calculate a sequence number difference between a sequence number of the next-to-last raw data block and a sequence number of a current raw data block;
    using the controller to determine whether the sequence number difference exceeds a number of operation rounds associated with encryption;
    in response to: (1) detecting that the next-to-last raw data block has been written into the input buffer and (2) determining that the sequence number difference does not exceed the number of operation rounds associated with encryption, using the controller to trigger a read of the next-to-last raw data block from the input buffer;
    using an encoder to encrypt, out of a sequence number order and using Advanced Encryption Standard (AES) processing and a CipherText Stealing (XTS) working mode, the next-to-last raw data block to produce a next-to-last encrypted data block; and
    using the encoder to encrypt, using the AES processing and the XTS working mode, a last raw data block in the raw data segment using the next-to-last encrypted data block.

12. The method recited in claim 11, wherein the detection that the next-to-last raw data block has been written into the input buffer triggers calculating the sequence number difference.

13. The method recited in claim 11, wherein the read of the next-to-last raw data block includes:
    moving the next-to-last raw data block to a position immediately after the current raw data block in the input buffer;
    pointing an updating read pointer to the next-to-last raw data block by updating a read pointer pointing to the current raw data block after the current raw data block is read; and
    reading the next-to-last raw data block using the updated read pointer.

14. The method recited in claim 13, wherein reading the next-to-last raw data block using the updated read pointer includes:
    iteratively updating the updated read pointer to point to each subsequent raw data block to produce an iteratively updated read pointer; and
    reading said each subsequent raw data block using the iteratively updated read pointer.

15. The method recited in claim 11, wherein encrypting the last raw data block includes using an intermediate encrypted data block that is read from a temporary register.

16. The method recited in claim 11, wherein the encoder includes a plurality of Data Processing (DP) units, wherein:

a given raw data block is passed from the input buffer to a corresponding DP unit in the plurality of DP units; and the corresponding DP unit encrypts the given raw data block by performing the number of operation rounds associated with encryption.

17. The method recited in claim 11, further including simultaneously writing the next-to-last encrypted data block and a last encrypted data block to an output buffer.

18. The method recited in claim 11, further including simultaneously writing the next-to-last encrypted data block and a last encrypted data block to an output buffer, including by incrementing a write pointer by 2.

19. The method recited in claim 11, further including sequentially writing a plurality of encrypted data blocks that is generated by the encoder into an output buffer.

20. The method recited in claim 11, wherein a size of the last raw data block is strictly smaller than a predetermined data block size specified by the AES processing.

\* \* \* \* \*